US007628174B2

(12) United States Patent
Kauss et al.

(10) Patent No.: US 7,628,174 B2
(45) Date of Patent: Dec. 8, 2009

(54) HYDRAULIC CONTROL ARRANGEMENT

(75) Inventors: Wolfgang Kauss, Francheville (FR); Didier Desseux, Solaize (FR)

(73) Assignee: Bosch Rexroth AG, Stuttgart (DE)

( * ) Notice: Subject to any disclaimer, the term of this patent is extended or adjusted under 35 U.S.C. 154(b) by 403 days.

(21) Appl. No.: 10/558,376

(22) PCT Filed: May 28, 2004

(86) PCT No.: PCT/EP2004/005837

§ 371 (c)(1),
(2), (4) Date: Mar. 21, 2006

(87) PCT Pub. No.: WO2004/109125

PCT Pub. Date: Dec. 16, 2004

(65) Prior Publication Data

US 2006/0191582 A1 Aug. 31, 2006

(30) Foreign Application Priority Data

Jun. 4, 2003 (DE) ................................ 103 25 296

(51) Int. Cl.
*F16K 11/07* (2006.01)

(52) U.S. Cl. .............................. 137/625.69; 137/514.3; 137/514.7; 137/601.21; 137/495; 251/51; 251/48

(58) Field of Classification Search .............. 137/596.1, 137/596.13, 596, 625.68, 625.69, 514.3–514.7, 137/494, 495, 601.21; 91/420, 446, 447, 91/468, 518; 251/48–55, 62–63.6
See application file for complete search history.

(56) References Cited

U.S. PATENT DOCUMENTS

| | | | | | |
|---|---|---|---|---|---|
| 1,366,151 | A | * | 1/1921 | Astrom | 137/515.5 |
| 2,512,189 | A | * | 6/1950 | Waterman | 251/51 |
| 2,574,314 | A | * | 11/1951 | Arden | 251/51 |
| 2,671,466 | A | * | 3/1954 | Conrad | 137/512.4 |
| 3,134,402 | A | * | 5/1964 | Tennis | 137/625.69 |
| 3,182,729 | A | * | 5/1965 | Carlin et al. | 137/625.69 |
| 3,194,265 | A | * | 7/1965 | Tennis | 137/596 |
| 3,263,574 | A | * | 8/1966 | Tennis | 137/625.69 |
| 3,298,394 | A | * | 1/1967 | Chorkey | 137/860 |
| 3,534,774 | A | * | 10/1970 | Tennis | 137/625.69 |
| 3,563,137 | A | * | 2/1971 | Graber et al. | 60/472 |
| 3,618,690 | A | * | 11/1971 | Johnson | 137/514.7 |
| 3,635,244 | A | * | 1/1972 | Lamborghini | 137/596 |
| 3,804,123 | A | * | 4/1974 | Marshall | 137/625.69 |
| 3,815,477 | A | * | 6/1974 | Ailshie et al. | 137/596.13 |

(Continued)

FOREIGN PATENT DOCUMENTS

DE 35 40 061 C2 3/1990

(Continued)

*Primary Examiner*—Stephen Hepperle
*Assistant Examiner*—Craig Price
(74) *Attorney, Agent, or Firm*—Oliff & Berridge, PLC

(57) ABSTRACT

A hydraulic control arrangement is disclosed for the load-independent control of a consumer with a continuously adjustable distribution valve having a pressure compensator down the line. According to the invention, the pressure compensator has a single-sided damping such that the movement in the opening direction is damped and the movement in the closing direction is substantially undamped. Furthermore, a control arrangement is disclosed in which a load-holding function is integrated in the pressure compensator.

15 Claims, 7 Drawing Sheets

U.S. PATENT DOCUMENTS

| | | | | |
|---|---|---|---|---|
| 3,970,108 | A * | 7/1976 | Ailshie | 137/596.13 |
| 4,009,864 | A * | 3/1977 | Schexnayder | 137/625.69 |
| 4,049,235 | A * | 9/1977 | Singleton | 137/625.69 |
| 4,066,239 | A * | 1/1978 | Hall | 137/625.69 |
| 4,139,021 | A * | 2/1979 | Ailshie et al. | 137/596.13 |
| 4,256,142 | A * | 3/1981 | Hancock | 137/596 |
| 4,766,929 | A * | 8/1988 | Yaindl | 137/514.3 |
| 4,787,294 | A | 11/1988 | Bowden | |
| 5,022,434 | A * | 6/1991 | Tsukimoto | 137/625.68 |
| 5,025,625 | A * | 6/1991 | Morikawa | 137/596.13 |
| 5,067,389 | A | 11/1991 | St. Germain | |
| 5,138,837 | A * | 8/1992 | Obertrifter et al. | 137/596.13 |
| 5,188,147 | A * | 2/1993 | Shirai et al. | 137/596 |
| 5,218,897 | A * | 6/1993 | Shirai et al. | 137/596.13 |
| 5,305,789 | A * | 4/1994 | Rivolier | 137/596 |
| 5,315,826 | A * | 5/1994 | Hirata et al. | 91/446 |
| 5,592,967 | A * | 1/1997 | Cho | 137/596.13 |
| 5,890,362 | A | 4/1999 | Wilke | |
| 5,996,623 | A * | 12/1999 | Omberg | 137/596.13 |
| 6,192,929 | B1 | 2/2001 | Matsumoto | |
| 6,532,989 | B1 | 3/2003 | Kauss | |
| 6,782,697 | B2 * | 8/2004 | Mather | 91/445 |
| 6,845,702 | B2 * | 1/2005 | Sagawa et al. | 91/446 |
| 6,854,270 | B2 * | 2/2005 | Zenker et al. | 91/446 |
| 7,337,807 | B2 * | 3/2008 | Koo et al. | 137/625.69 |
| 7,395,662 | B2 * | 7/2008 | Kauss | 91/447 |
| 2004/0040294 | A1 * | 3/2004 | Sagawa et al. | 60/452 |
| 2007/0028973 | A1 * | 2/2007 | Kobayashi et al. | 137/625.69 |

FOREIGN PATENT DOCUMENTS

| | | | |
|---|---|---|---|
| DE | 39 11 204 | C2 | 5/1992 |
| DE | 296 17 735 | U1 | 12/1997 |
| DE | 40 05 966 | C2 | 8/1999 |
| WO | WO 95/32364 | A1 | 11/1995 |
| WO | WO00/34665 | * | 6/2000 |

* cited by examiner

HYDRAULIC CONTROL ARRANGEMENT

DESCRIPTION

The invention relates to a hydraulic control arrangement for the load-independent control of a consumer and a pressure compensator for a control arrangement of this type.

The basic structure of such control arrangements is known, for instance, from WO 95/32364 A1. In such a load pressure-independent flow distribution (LUDV)[1] system each consumer is allocated to an adjustable metering orifice including a pressure compensator down the line, the latter keeping the pressure drop above the metering orifice constant so that the amount of pressure medium flowing to the respective hydraulic consumer is dependent on the opening cross-section of the metering orifice and not on the load pressure of the consumer or on the pump pressure. Since, for instance, in mobile working implements a plurality of such valve arrangements are connected in parallel, it is achieved by the individual pressure compensators of the system that, in the case that a hydro pump of the system has been adjusted up to the maximum stroke volume and the pressure medium flow is not sufficient to maintain the predetermined pressure drop above the metering orifices of the respective valve arrangements allocated to a consumer, the pressure compensators of all operated hydraulic consumers are adjusted in the closing direction so that all pressure medium flows are reduced by the same percentage. Due to this load-pressure independent flow distribution (LUDV) all operated consumers move at a velocity which is reduced in percentage by the same value.

LUDV hydraulic systems of this type are employed to an increasing extent in mobile working implements of combined movements. The operating movements of these mobile working implements (mini and compact excavators, combined dredger-loaders, telescopic loaders, compact loaders etc.) are to be performed free of vibration and pressure of the control by the driver. It has turned out that for the vibration-free control a damping of the LUDV pressure compensators is required.

A damping is known, for instance, from U.S. Pat. No. 6,532,989 B1. In this known solution the pressure compensator includes a rear pressure chamber and an annular pressure chamber to both of which pressure acting in the closing direction on a pressure compensator piston can be applied, while the pressure applied downstream of the metering orifice, usually the load pressure of the driven consumer, acts in the opening direction on a front face of the pressure compensator piston. Between the rear pressure chamber and the damping chamber a damping nozzle is provided through which the pressure medium has to flow out of the damping chamber or into the same upon the axial displacement of the pressure compensator piston so that the movement of the pressure compensator piston is damped. Such a damping necessarily entails delays when opening and closing the pressure compensator with the consequence of a delayed start of operating movements with high load.

Compared to that, the object underlying the invention is to provide a control arrangement and a load-pressure independent flow distribution pressure compensator suited for this purpose in which the delay of the operating movement of a consumer is minimized despite the damping of the pressure compensator.

This object is achieved regarding the hydraulic control arrangement and regarding the pressure compensator by the features disclosed herein.

In accordance with the invention, in addition to the damping nozzle connecting the damping chamber to the pressure chamber a connecting recess having a larger cross-section than the damping nozzle is provided by which the damping chamber is communicated with a rear pressure chamber which can be shut off by a check valve opening toward the damping chamber. By this measure the movement of the pressure compensator piston in the opening direction in response to the orifice cross-section is relatively strongly damped, while in the closing direction the check valve opens and thus controls a comparatively large cross-section to be opened —i.e. the pressure compensator is damped single-sided so that the pressure compensator of a consumer having a lower load pressure closes quickly, for instance, and in this way permits the quick pressure build-up to a higher load pressure in a different disk.

In a preferred embodiment the pressure compensator piston is in the form of a stepped hollow piston, as described in U.S. Pat. No. 6,532,989 B1. This hollow piston is guided on an axial male member provided with a blind-hole bore which opens into the rear pressure chamber. An inner annular face confines the damping chamber by an appropriately formed portion of the male member. The pressure downstream of the metering orifice is applied to the bottom-side annular face of the step piston in the opening direction of the pressure compensator.

In the known solutions a rear control chamber of the pressure compensators is connected to the load-detecting line in which the highest load pressure of all driven consumers tapped by a shuttle valve chain is applied. If the load pressure of an operated hydraulic consumer quickly increases above the currently prevailing highest load pressure, the pressure immediately increases at the front side of the pressure compensator piston of the corresponding pressure compensator, while a respective pressure increase occurs in a delayed form in the rear control chamber via the shuttle valve chain and the load-detecting line. The temporary imbalance of forces caused thereby at the control piston of the pressure compensator can have a negative influence on the control of the hydraulic consumer. For instance, the hydraulic consumer may temporarily drop somewhat or the load-independent flow distribution may be disturbed.

In order to avoid such an undesired dropping of the consumer, in the aforementioned solutions additional load-holding valves are inserted in the pressure medium flow path between the consumer and the pressure compensator so that the pressure medium can be prevented from flowing from the consumer by the pressure compensator. However, such additional load-holding valves render the control arrangement more expensive and require considerable construction space.

In order to eliminate this drawback, in U.S. Pat. Nos. 5,067,389, 5,890,362 and 4,787,294 pressure compensators are suggested in which the load-holding function is integrated in the pressure compensator. The pressure compensator is provided with two pressure compensator pistons connected in series which are switched such that the pressure compensator is closed when the pressure applied to the entry of the pressure compensator is lower than the individual load pressure while the pressure compensator piston is open.

DE 40 05 966 C2 suggests a solution in which a shuttle valve by which the pressure downstream of the metering orifice and in the load-detecting passage is compared and is signaled to the rear control chamber is integrated in the pressure compensator piston.

In DE 296 17 735 U1 a pressure compensator is described in which the load is detected by a complex shuttle valve circuit including check valves and nozzles so as to keep the pressure compensator of the load-holding function in the closed state.

All the described known solutions having a load-holding function in the pressure compressor share the drawback that a considerable effort is necessary to tap off a control pressure which is applied to the pressure compensator piston in the load-holding function in the closing direction.

In accordance with an embodiment, the damping chamber is connected to the passage guiding the individual load pressure via the damping nozzle so that, in case that the pressure decreases below this load pressure at the entry of the pressure compensator, the pressure compressor piston is brought in its closing position by the individual load pressure applied to the damping chamber so that the pressure compensator also adopts the load-holding function. Vis-à-vis the above-described solutions including a load-holding function, the design according to the invention excels by an extremely compact and simple construction.

As an alternative, the damping nozzle can also connect the damping chamber to the rear pressure chamber, wherein the load-holding function is renounced, however.

It is preferred that at a bottom-side end portion of the male member a transverse bore opening in the blind hole is provided which is controlled to be completely opened in the opening position of the pressure compensator piston so that the pressure is tapped off downstream of the metering orifice and is guided into the rear pressure chamber.

In an especially preferred embodiment a bore or a recess is formed at the smaller diameter of the pressure compensator piston which can be positioned in such manner with respect to the transverse bore that the pressure downstream of the metering orifice is signaled in the blind hole bore.

In the case of an alternative solution according to the invention, this connection between the passage downstream of the metering orifice and the rear pressure chamber is always opened. In a preferred solution this connection is controlled to be opened, however, only during the initial stroke (seen from the closing position) and with a completely open pressure compensator, whereas in the range lying therebetween this connection is closed so that the maximum effective load pressure is then applied to rear pressure chamber, whereas at the beginning of opening the pressure compensator the pressure downstream of the metering orifice—i.e. approximately the pump pressure—is applied to the rear pressure chamber.

The check valve according to the invention can be formed by a simple O-ring which is placed on the male member or by a closing plate biased into a closing position. As an alternative, also conventional check valves including spring-biased closing members can be used.

The pressure compensator piston can be biased in the closing position by a comparatively weak control spring.

Other advantageous further developments of the invention constitute the subject matter of further subclaims.

Hereinafter preferred embodiments of the invention will be illustrated in detail by way of schematic drawings, in which.

Figure 1:
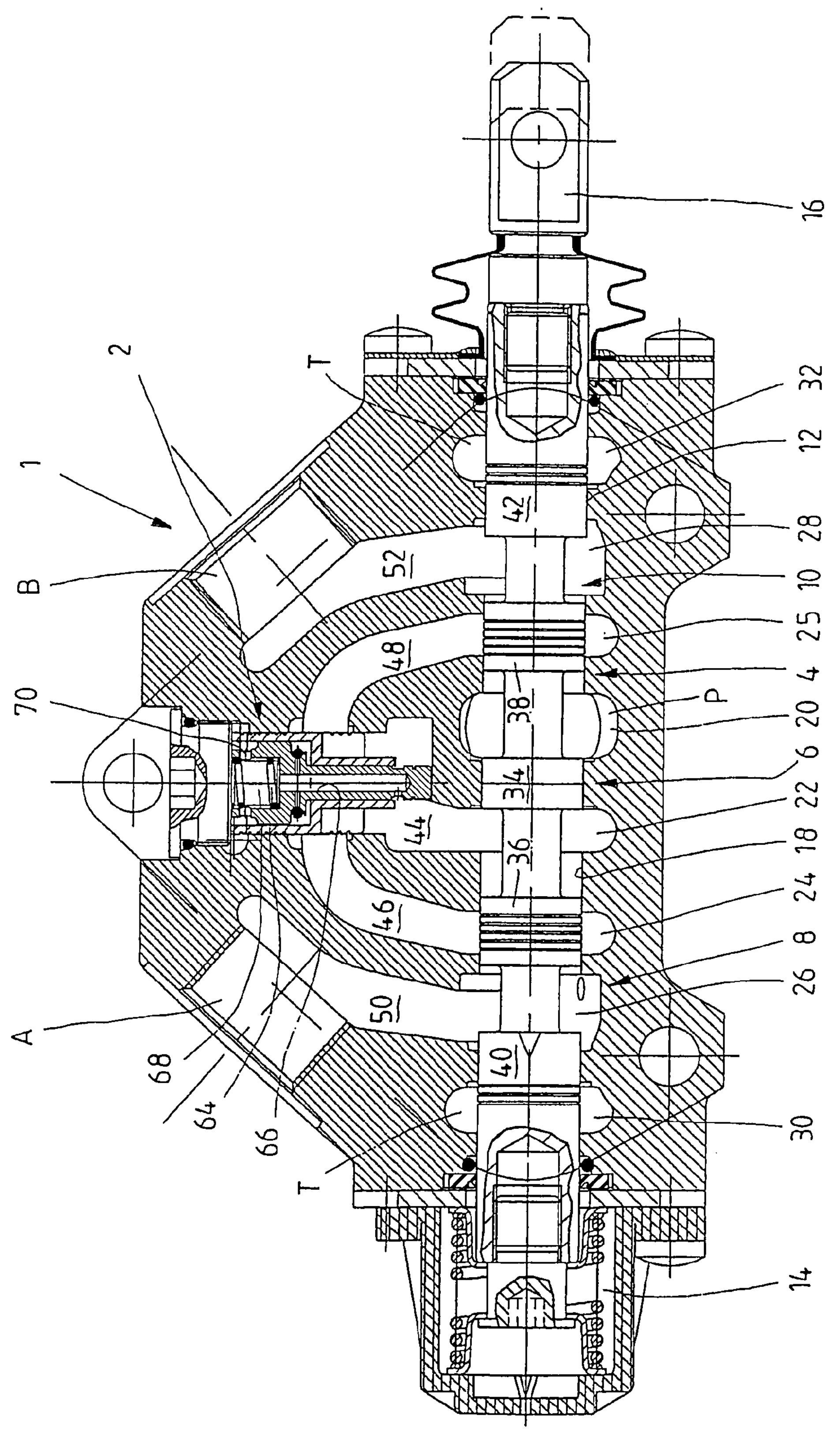
FIG. 1 shows a sectional view of a valve plate including a half-sided damped LUDV pressure compensator.

FIG. 1 shows a section across a valve plate 1 of a control block of a mobile working implement, for instance a mini or compact excavator, combined dredger-loader, telescopic loader, compact loader. In this valve plate 1 a proportionally adjustable distribution valve 4 and a LUDV pressure compensator 2 are accommodated via which the pressure medium flow between a consumer of the mobile working implement connected to the working connections A, B and a pressure connection and a reservoir connection (both not represented) is controllable. The distribution valve 4 has a velocity member 6 defining the pressure medium volume flow to the consumer and two directional members 8, 10 by which the flow direction of the pressure medium to and, resp., from the consumer is controlled.

The distribution valve 4 includes a slide valve 12 biased by a centering spring arrangement 14 into the shown home position. The slide valve 12 is actuated via an operating portion 16 laterally guided out of the valve disk 1 which is hinged to an actuating lever or the like in the driver's cabin.

The slide valve 12 is guided in a valve bore 18 which is extended in the radial direction to a pressure chamber 20, an inlet chamber 22, two outlet chambers 24, 25 arranged approximately symmetrically to the pressure chamber 20, two working chambers 26, 28 arranged on both sides thereof as well as two adjacent reservoir chambers 30, 32. The slide valve 12 includes a central metering orifice collar 34 which, jointly with the remaining ring land between the pressure chamber 20 and the inlet chamber 22, defines a metering orifice forming the velocity member 6. On both sides of this metering orifice collar 34 two control collars 36, 38 and two reservoir collars 40, 42 of the directional members 8, 10 are arranged at the slide valve 12.

The pressure chamber 20 is connected to the pressure connection P and the two reservoir chambers 30, 32 are connected to the reservoir connection T. The inlet chamber 22 is connected to the entry of the pressure compensator 2 via an inlet passage 44. The exit thereof is connected to the outlet chamber 24 and, resp., 25 via two outlet passages 46, 48. The two working chambers 26, 28 are connected to the working connection A and, resp., B via working passages 50 and, resp., 52.

Figure 2:
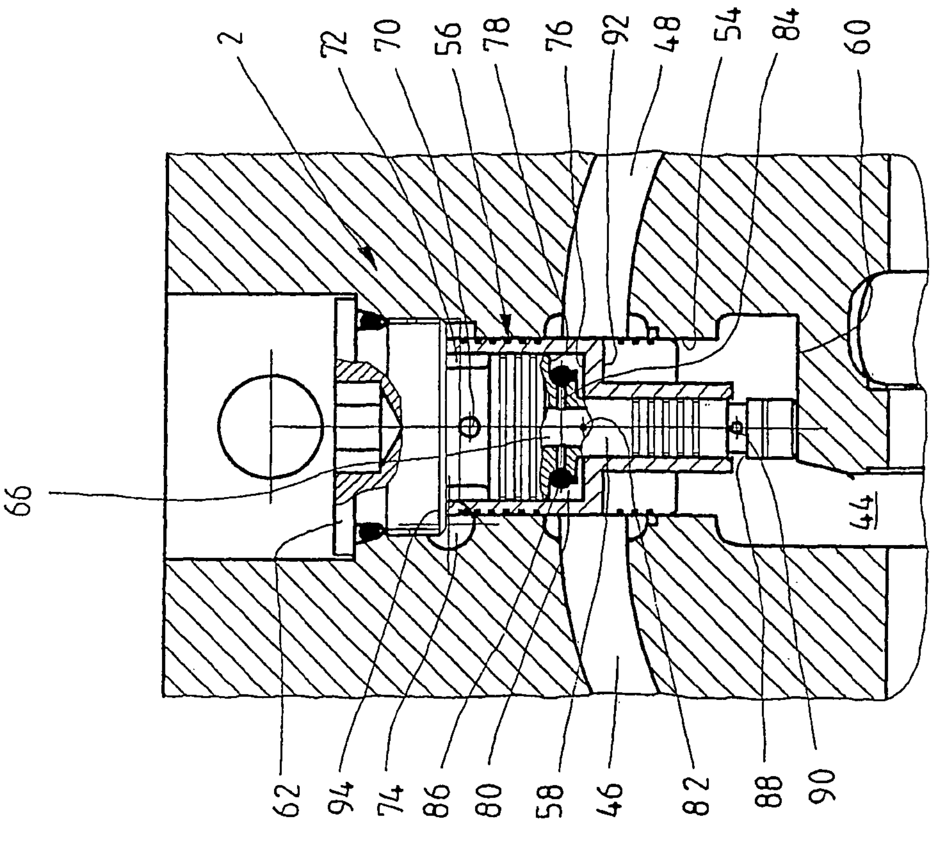
FIG. 2 shows an enlarged representation of an LUDV pressure compensator according to FIG. 1.

The structure of the pressure compensator 2 is illustrated by way of the enlarged representation in FIG. 2. In the FIGS. 1 and 2 the pressure compensator 2 is shown in the completely opened operating position in which the inlet passage 44 is controlled to be completely opened toward the outlet passage 46. The pressure compensator 2 has a pressure compensator piston 56 guided in a pressure compensator bore 54 which is in the form of a hollow step piston and is guided on an appropriately stepped stationary male member 58. The latter is fixed in the axial direction by a shoulder 60 of the housing member and a screw plug 62 screwed into the pressure compensator bore 54. As one can take especially from FIG. 1, the male member 58 is biased by means of a spring 64 in the direction of the shoulder 60 for compensating an axial play required for design reasons. This spring 64 cannot be seen in the partial section in FIG. 2. The male member 58 moreover includes a blind hole bore 66 which is closed toward the shoulder 60 and which opens into a rear spring chamber 68 connected via radial bores 70 to a rear pressure chamber 72 into which the end portion of the pressure compensator piston having the larger diameter immerses with its rear annular face. To this pressure chamber 72 the highest load pressure of all consumers connected to the control block is applied via an LS passage 74.

An inner annular face 76 delimits, by a ring face 78 of the male member, a damping chamber 80 in the axial direction which is connected to the blind hole bore 66 via a damping nozzle 82 passing through the circumferential wall of the male member 58 in the radial direction (normal to the plane of projection). In parallel to this damping nozzle 82, in the male member 58 plural radially extending connecting recesses 84 are formed which equally extend between the blind hole bore 66 and the damping chamber 80. The damping nozzle 82 has a comparatively small diameter relative to the connecting recesses 84. The opening area of the connecting recesses 84 at the side of the damping chamber is closed by an elastic O-ring 86 acting as check valve which prevents a pressure medium flow from the damping chamber 80 through the connecting recesses 84 into the blind hole bore 66 and admits the same in the opposite direction.

At the bottom-side end portion of the male member 58 an annular groove 88 is formed into which a load-detecting orifice 90 opens by which the entry of the pressure compensator 2 is connected to the blind hole bore 66. This load-detecting orifice 90 is controlled to be opened when the pressure compensator 2 is completely opened so that the pressure prevailing at the entry of the pressure compensator, i.e. the individual load pressure acts also in the rear pressure chamber 72 and is signaled into the LS passage 74. In the closing position of the pressure compensator piston 56 the load-detecting orifice 90 is closed in the embodiment represented in FIG. 2.

In the home position of the slide valve shown in FIG. 1 the metering orifice is controlled to be closed and the two working connections A, B are shut off against the reservoir passage T. The pressure compensator is closed and thus also the connection between the passages 46, 48 and 44 is blocked. When the slide valve 12 is axially displaced, for instance to the right in FIG. 1, a metering orifice opening through which the pressure chamber 20 is connected to the supply chamber 22 is opened by the control notches formed at the metering orifice collar 34. At the beginning of this opening movement the pressure in the supply chamber 44 corresponds approximately to the pump pressure. This pump pressure acts upon the outer annular face 92 of the pressure compensator piston 56 in the opening direction, while the pressure prevailing in the pressure chamber 72 and thus the load pressure is applied to the rear annular face 94. The pump control allows the pump pressure to increase until the load pressure which keeps the pressure compensator closed is reached. The pressure compensator piston 56 lifts off its stop at the shoulder 60 and opens the connection from the inlet passage 44 to the working passage 46. In this shown variant the control amount for the LS passage connected to the pump control is taken from the consumer, whereby under unfavorable operating conditions the connected consumer may drop.

In the case in which only the one consumer is driven, the pressure compensator 2 opens completely so that the load-detecting orifice 90 is opened and accordingly the load pressure prevailing in the working passage 46 is guided into the pressure chamber 72 and thus into the LS passage 74.

During opening movements of the pressure compensator piston 56 pressure medium must be displaced from the diminishing damping chamber 80. Since the comparatively large cross-section of the connecting recesses 84 is shut off by the O-ring 86, the pressure medium flows through the small damping nozzle 82 into the blind hole bore 66 so that the opening movement of the pressure compensator piston 56 is relatively strongly damped.

If a second consumer having a higher load pressure is actuated, this higher load pressure acts in the LS passage 74 common to all consumers—the pressure compensator piston 56 is appropriately moved to the closing direction until a pressure balance is brought about. In this control position the pressure drop above the corresponding metering orifice is kept constant, whereby also the amount of flow selected at each consumer is kept proportionally constant.

During this closing movement of the pressure compensator piston 56 the damping chamber 80 is enlarged so that pressure medium is appropriately allowed to flow from the blind hole bore 66 into the damping chamber 80. The elasticity of the O-ring 86 admits a pressure medium flow in this direction so that pressure medium is allowed to flow through the comparatively large cross-section of the connecting recesses 84—the closing movement of the damping piston is performed almost undamped so that the consumer having the higher load is driven practically without delay.

Figure 4:
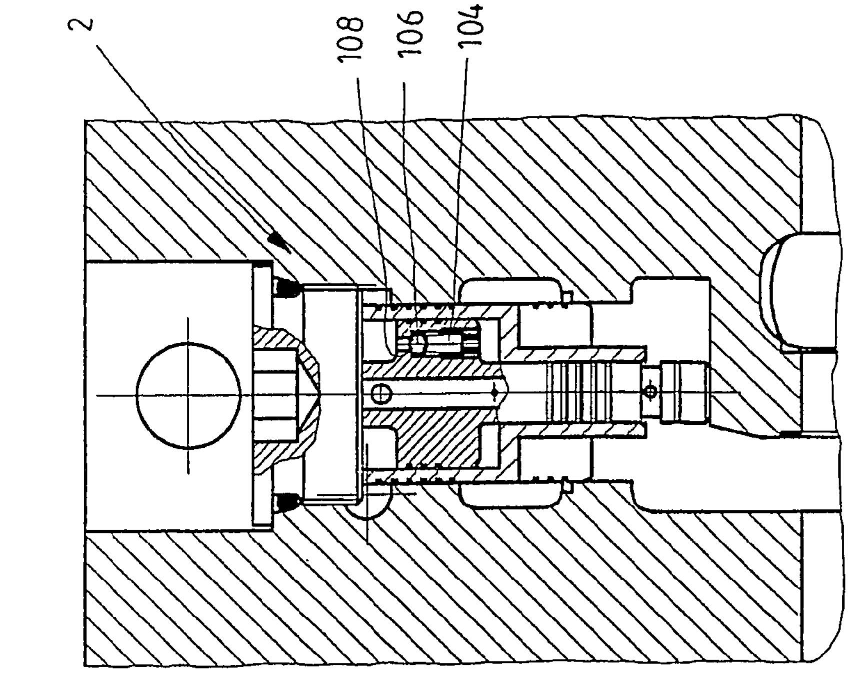
FIGS. 3 and 4 show embodiments of the half-sided damped pressure compensator of FIG. 1.
Figure 3:
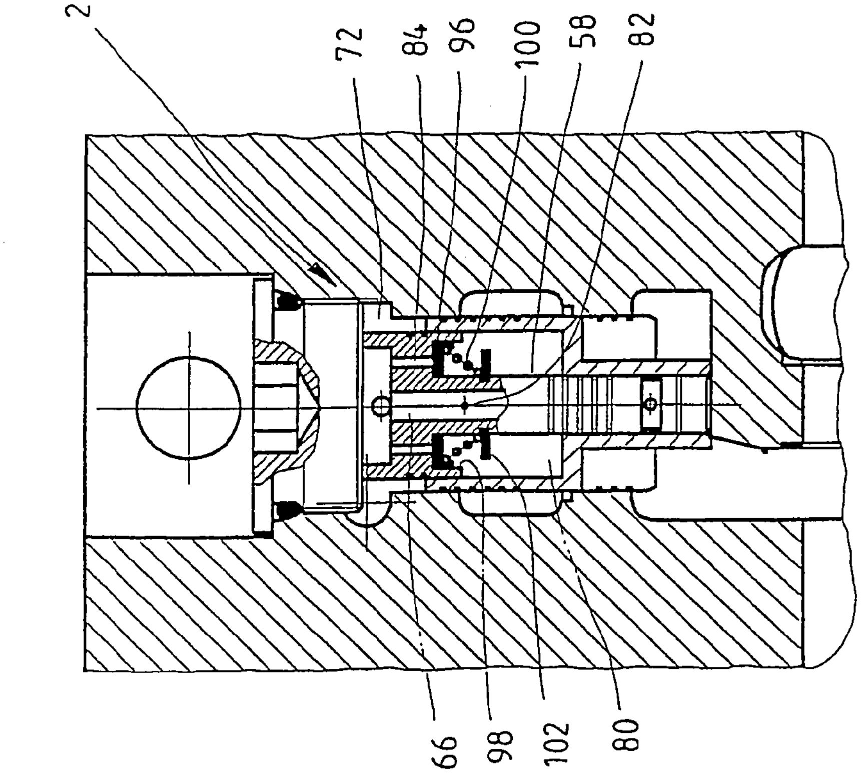

In the FIGS. 3 and 4 two variants of a pressure compensator 2 are shown, wherein different check valve arrangements are employed instead of the O-ring 86.

The basic structure of the pressure compensator 2 is the same in each case as in FIG. 2 so that hereinafter merely the differences will be discussed. In the embodiment shown in FIG. 3 the connecting recesses 84 are not formed in the radial direction between the damping chamber 80 and the blind hole bore 66 but they are formed as a bore star designed to be symmetrical with respect to the pressure compensator axis. The rear pressure chamber 72 is connected directly to the damping chamber 80 via these axially extending connecting recesses 84. The check valve is formed by an annular closing disk 96 which encompasses the male member 58 and is inserted in an axial groove 98 at the lower end face in FIG. 3 of the larger end portion of the male member 58. The closing disk 96 is biased in the closing direction by the force of a valve spring 100 which is supported on a spring plate 102 inserted in an annular groove of the male member 58. The strength of the valve spring 100 is selected such that a pressure medium flow from the rear pressure chamber 72 into the damping chamber 80 can take place during the closing movement of the pressure compensator piston 56 with a comparatively small loss of pressure so that the damping is by far lower than during the closing movement of the pressure compensator piston during which the pressure medium has to flow via the small damping nozzle 82.

In the embodiment shown in FIG. 4 instead of the bore star closable by the valve disk 96 a single axial bore is provided in the male member, into which a check valve 104 including a valve body 106 is inserted, the latter being biased against a valve seat 108. The function of this check valve 104 corresponds to that of the afore-described embodiment so that further explanations can be dispensed with.

Figure 5:
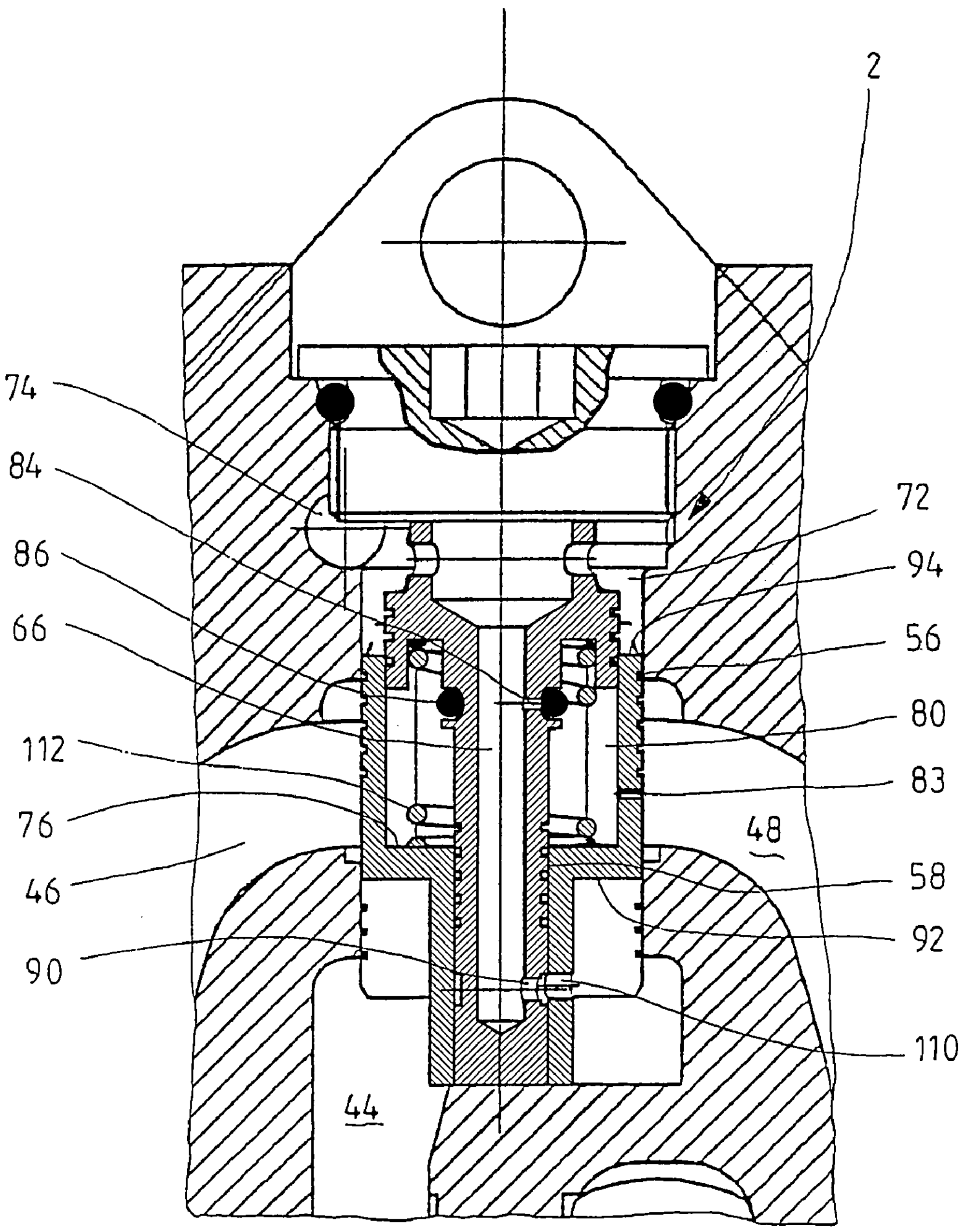
FIG. 5 illustrates an LUDV pressure compensator having an integrated load-holding function.

FIG. 5 shows a further variant of a LUDV pressure compensator 2 according to the invention in which, apart from the above-described single-sided damping, a load-holding function is further integrated which prevents a drop of the load so that additional load-holding valves can be renounced.

The basic structure of the embodiment shown in FIG. 5 largely corresponds to that of the foregoing embodiments so that only the differences have to be discussed.

In the variant according to F*igure* 5, too, a pressure compensator piston 56 is guided to be axially movable on a male member 58. The pressure prevailing in the pressure chamber 72 is applied to the rear annular face 94 and the pressure prevailing at the entry of the pressure compensator 2, i.e. the pressure prevailing in the inlet passage 44 (downstream of the metering orifice) is applied to the outer annular face 92. Inside the pressure compensator piston 56 again the damping chamber 80 is formed so that the pressure prevailing in this damping chamber 80 is applied to the inner annular face 76 in the closing direction. Between the blind hole bore 66 of the male member 58 and the damping chamber 80 radially extending connecting recesses 84 are formed—as in the embodiment according to FIG. 2 —which are closed by an 0-ring 86 at the side of the damping chamber. At the bottom-side end portion the male member 58 includes a load-detecting orifice 90. Up to this point the embodiment according to FIG. 5 corresponds completely to the embodiment according to FIG. 2. The substantial difference resides in the fact that the small damping nozzle 82 is not formed in the male member. Instead, a small damping nozzle 83 is formed in the shell of the damping piston 56 so that the damping chamber 80 is not connected to the blind hole bore 66 but to the working passages 46, 48 via this damping nozzle 83. Thus, the load pressure effective at the corresponding consumer acts in the damping chamber 80 via the damping nozzle 83.

Moreover, at the end portion of the pressure compensator piston 56 having a smaller diameter a bore 110 is formed which is in alignment with the load-detecting orifice 90 in the closing position of the pressure compensator 2 shown in FIG. 5 so that pressure medium from the inlet passage 44 can enter into the blind hole bore 66.

The damping chamber 80 moreover acts as spring chamber for a spring 112 which is supported on the adjacent annular face of the male member 58 and acts on the inner annular face 76 of the compensator piston 56. Also this spring 112 serves for compensating the structurally predetermined play in the axial direction and for ensuring a quick closing of the pressure compensator piston 56—basically the spring 112 could be dispensed with.

In the home position of the spool valve and with a closed pressure compensator 2 the load pressure acts on the corresponding consumer through the working passages 46, 48 and the small damping nozzle 83 in the damping chamber 80. The O-ring 86 shuts off the passageway to the blind hole bore 66. In the blind hole bore 66 and in the connected pressure chamber the pressure is effective in the inlet passage 44 via the load-detecting orifice 90 and the bore 110.

Upon actuation of the slide valve 12 this pressure prevailing in the inlet passage 44, i.e. the pressure downstream of the metering orifice initially corresponds substantially to the pump pressure so that in the pressure chamber 72 equally pump pressure is applied. In this embodiment thus the LS passage 74 is filled via the pump in the shown home position of the pressure compensator and not—as in the afore-described embodiments—via the load so that a drop of the consumer is prevented during the control due to a filling of the LS passage 74.

The pump control of the non-represented pump allows the applied pump pressure to increase until the load pressure which keeps the pressure compensator closed is reached. Since the pump pressure is active in the LS passage 74 at the beginning of the control and it is further signaled to the pump controller, the latter so-to-speak pulls "itself up" until the balance of forces with the force active in the closing direction is reached, which force is substantially determined by the load pressure acting on the inner annular face 76 (and the pressure prevailing in the rear pressure chamber). The pressure compensator piston 56 then starts to open the passageway to the working passage 46, 48 and thus to the consumer. At the same time, the overlapping of the load-detecting orifice 90 with the bore 110 is eliminated so that the load-detecting orifice 90 is controlled to be closed.

Figure 6:
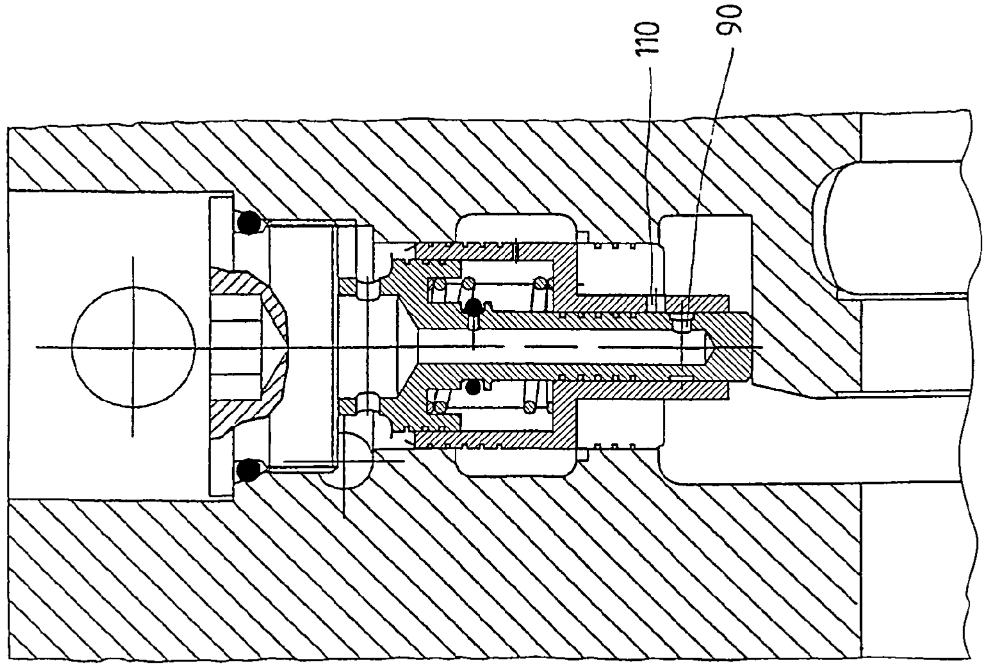

This operating state is represented in FIG. 6. Initially a minimal pressure medium volume flow still flows to the consumer, i.e. the pressure drop above the metering orifice is small. The pressure drop controlled by the pump control still occurs almost completely above the pressure compensator which is further opened due to this pressure difference. Finally the pressure compensator is controlled to be completely opened (cf. FIG. 7), wherein the load-detecting orifice 90 is controlled to be opened again by the lower annular face 90 of the pressure compensator piston 56. Now the blind hole bore 66, the pressure chamber 72 and thus the LS passage 74 are supplied via the load-detecting orifice 90 with a volume flow which is substantially constant by a current regulator down the line. The pressure drop generated by this volume flow between the front and the rear of the pressure compensator 2 is higher than the force of the spring 112—the pressure compensator remains completely opened. The spring only serves—as stated before—for maintaining the pressure compensator in closing readiness.

If a further consumer having a higher load pressure is actuated, the pressure compensator of the first driven consumer is brought into its control position in the above-described manner so that the pressure drop above the metering orifice remains constant and all consumers are provided with pressure medium independent of the load.

If the pump pressure falls below the load pressure due to variations in the pressure medium supply, the pressure compensator piston 56 is quickly moved into its closing position by the load pressure acting on its inner annular face 76 and acts as a load-holding valve.

Figure 7:
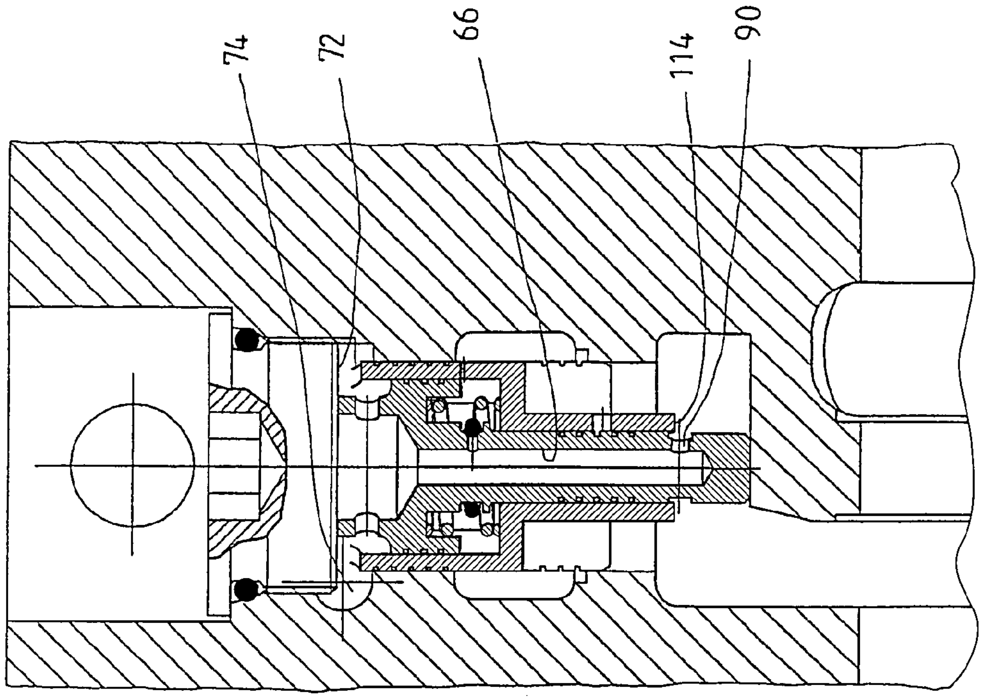
FIGS. 6 and 7 show operating states of the LUDV pressure compensator of FIG. 5 and FIGS. 8A and 8B show another embodiment of an LUDV pressure compensator having a load-holding function.
Figure 8A:
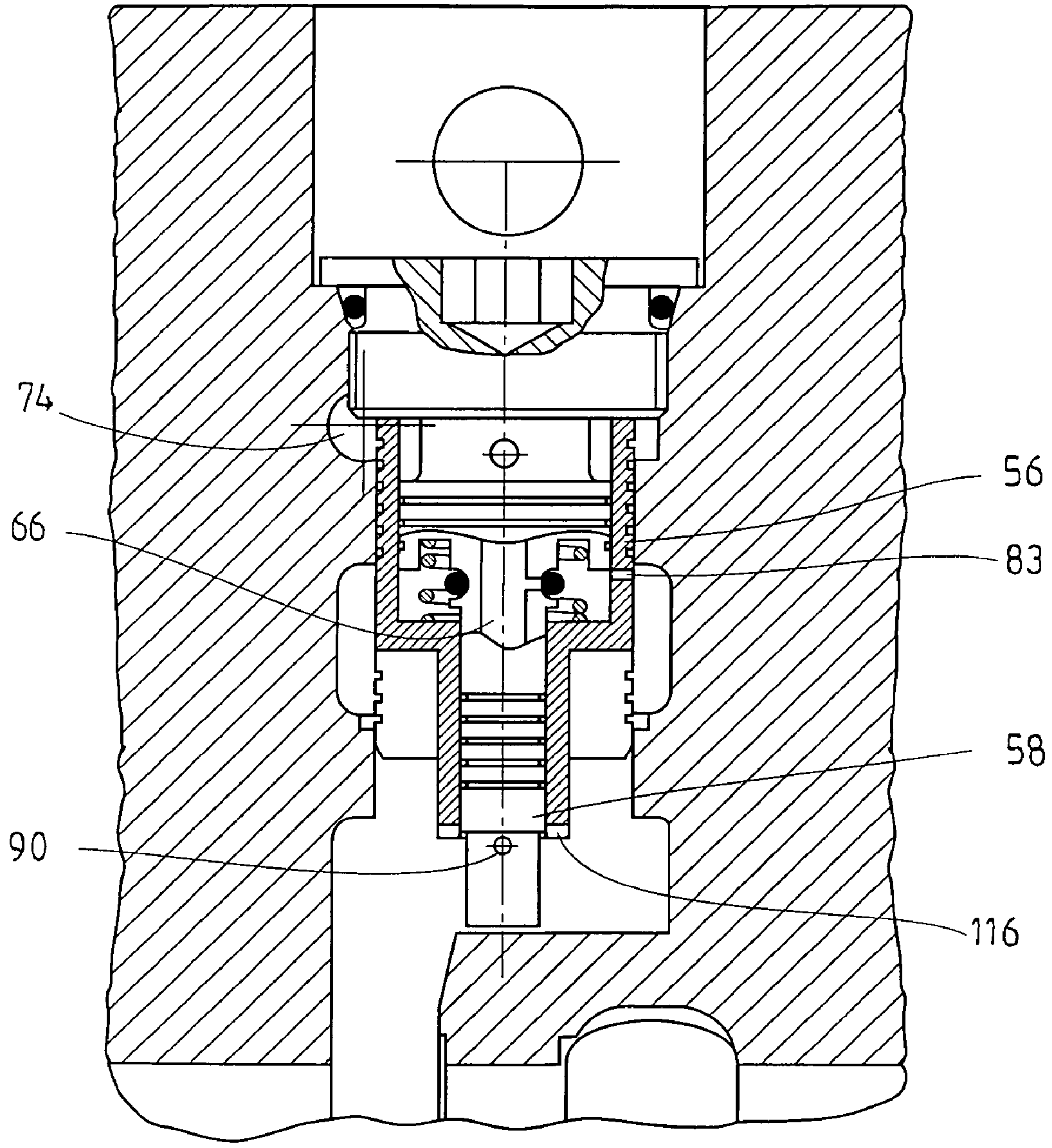
Figure 8B:
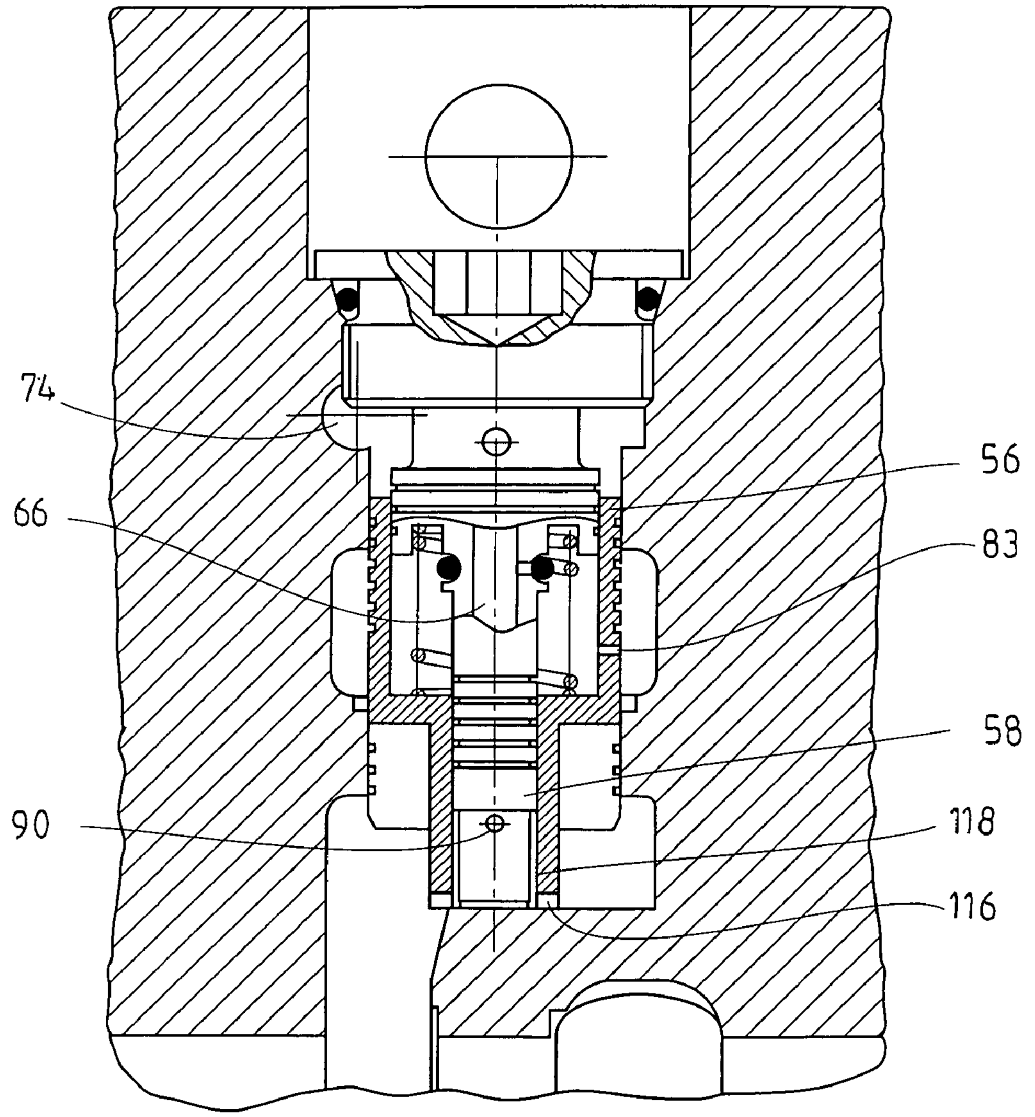

Ultimately FIGS. 8A and 8B show a variant of the embodiment described in the FIGS. 5 to 7 in which at the smaller diameter of the hollow pressure compensator piston 56 no radial bore 110 but recesses 116 are provided in the end face formed by the annular face 114 which recesses open into an annular gap 118 formed by a step-back of the male member 58. This annular gap 118 extends in the axial direction to the load-detecting orifice 90. When the pressure compensator is completely opened (FIG. 8A), the load-detecting orifice 90 is controlled to be completely opened so that no hydraulic resistance (annular gap 118) is connected upstream.

Thus, in this variant the load-detecting line of the control block is provided with pressure medium tapped off by the pump via all disks. Preliminary tests have demonstrated that this variant influences the LUDV control characteristic, because the LS line is supplied by all active consumers.

Applicant reserves itself the right to direct a separate patent application to the load-holding function, wherein the claim may be focused on applying the load pressure to the damping chamber 80.

A hydraulic control arrangement is disclosed for the load-independent control of a consumer with a continuously adjustable distribution valve having a pressure compensator down the line. According to the invention, the pressure compensator has a single-sided damping such that the movement in the opening direction is damped and the movement in the closing direction is substantially undamped. Furthermore, a control arrangement is disclosed in which a load-holding function is integrated in the pressure compensator.

LIST OF REFERENCE NUMERALS

1 valve disk
2 LUDV (load-independent distribution valve) pressure compensator
4 distribution valve
6 velocity member
8 directional member
10 directional member
12 slide valve
14 centering spring arrangement
16 operating portion
18 valve bore
20 pressure chamber 22 inlet chamber
24 outlet chamber
25 outlet chamber
26 working chamber
28 working chamber
30 reservoir chamber
32 reservoir chamber
34 metering orifice collar
36 control collar
38 control collar
40 reservoir collar
42 reservoir collar
44 inlet passage
46 outlet passage
48 outlet passage
50 working passage
52 working passage
54 pressure compensator bore
56 pressure compensator piston
58 male member
60 shoulder
62 screw plug
64 spring
66 blind hole bore
68 spring chamber
70 radial bore
72 pressure chamber
74 LS passage
76 inner annular face
78 annular face
80 damping chamber
82 damping nozzle
84 connecting recess
86 O-ring
88 annular groove
90 load-detecting orifice
92 outer annular face
94 rear annular face
96 closing disk
98 axial groove
100 valve spring
102 spring plate
104 check valve
106 valve body
108 valve seat
110 bore
112 spring
114 annular face
116 recesses
118 annular groove

The invention claimed is:

1. A hydraulic control arrangement for the load-independent control of a consumer with a continuously adjustable distribution valve comprising:

a metering orifice; and a pressure compensator including a stepped pressure compensator piston having an outer annular face, a rear pressure chamber and an annular damping chamber connected via a damping nozzle to an adjacent pressure medium containing chamber, wherein a control pressure acting on the stepped pressure compensator piston in a closing direction of the piston can be applied to the pressure chamber and to the damping chamber, a pressure downstream of the metering orifice in an opening direction of the piston is applied to the outer annular face of the stepped pressure compensator piston, a connecting recess is provided between the rear pressure chamber and the damping chamber, and a check valve opening toward the damping chamber is allocated to the connecting recess, the connecting recess having a larger cross-section than the damping nozzle, such that movement of the pressure compensator piston in the opening direction in response to the damping nozzle cross-section is relatively strongly damped, while in the closing direction the check valve opens and thus controls the larger cross-section to be opened.

2. A control arrangement according to claim 1, wherein the pressure compensator piston is a hollow piston and is guided on an axial male member having a blind hole bore which opens into the rear pressure chamber.

3. A control arrangement according to claim 2, wherein the damping nozzle connects the damping chamber to a passage guiding a load pressure of the corresponding consumer.

4. A control arrangement according to claim 2, wherein the damping nozzle connects the damping chamber to the rear pressure chamber.

5. A control arrangement according to claim 2, wherein at a bottom-side end portion of the male member a load-detecting orifice opening into the blind hole bore is provided, the load-detecting orifice being controlled to be completely opened in the opening position of the stepped pressure compensator piston.

6. A control arrangement according to claim 5, wherein at a smaller diameter of the stepped pressure compensator piston a separate bore or a circumferential recess is formed via which pressure downstream of the metering orifice can be signaled into the blind hole bore.

7. A control arrangement according to claim 6, wherein in a closing position of the stepped pressure compensator piston the separate bore is overlapping the load-detecting orifice, which can be controlled to be closed in a subsequent stroke of the stepped pressure compensator piston and can be controlled to be opened again by the stepped pressure compensator piston upon reaching the opening position.

8. A control arrangement according to claim 7, wherein the circumferential recess opens into an annular gap between the male member and the pressure compensator piston extending toward the load-detecting orifice.

9. A control arrangement according to claim 1, wherein the connecting recess is formed by bores arranged in a star-shape opening into the blind hole bore and being closable by an O-ring placed on the male member.

10. A control arrangement according to claim 1, wherein the connecting recess is formed by a bore of the male member opening into the pressure chamber in which bore a check valve is accommodated.

11. A control arrangement according to claim 1, wherein the pressure compensator piston is biased into its closing position by a spring.

12. A pressure compensator for a hydraulic control arrangement, comprising a stepped pressure compensator piston in the form of a hollow piston guided on a male member whose rear annular face delimits a rear pressure chamber and whose inner annular face delimits an annular damping chamber in sections, the damping chamber being connected to an adjacent pressure medium containing chamber via a damping nozzle, wherein a pressure acting in a closing direction of the piston can be applied to the inner annular face and the rear annular face and a pressure acting in an opening direction of the piston can be applied to an outer annular face of the stepped pressure compensating piston, a connecting recess of the male member is provided between the rear pressure chamber and the damping chamber, and a check valve opening toward the damping chamber is allocated to the connecting recess, the connecting recess having a larger cross-section than the damping nozzle, such that movement of the pressure compensator piston in the opening direction in response to the damping nozzle cross-section is relatively strongly damped, while in the closing direction the check valve opens and thus controls the larger cross-section to be opened.

13. A pressure compensator according to claim 12, wherein the pressure medium containing chamber guides a load pressure of a corresponding consumer.

14. A pressure compensator according to claim 12, wherein the damping nozzle connects the damping chamber to the rear pressure chamber.

15. A pressure compensator according to claim 12, wherein in the male member a blind hole bore opening into the rear pressure chamber is formed into which a load-detecting orifice opens at a bottom side, a separate bore of the pressure compensator piston being allocated to the load-detecting orifice and being overlapped with the load-detecting orifice in a closing position of the stepped pressure compensator piston, wherein upon a subsequent opening movement the load-detecting orifice can be controlled to be closed and in a completely opened position of the stepped pressure compensator piston can be controlled to be opened again.

* * * * *